US010321206B2

(12) United States Patent
Liu et al.

(10) Patent No.: US 10,321,206 B2
(45) Date of Patent: Jun. 11, 2019

(54) METHOD FOR SWITCHING AN AUDIO/VIDEO APPLICATION, APPARATUS AND SMART TV

(71) Applicants: HISENSE ELECTRIC CO., LTD., Qingdao (CN); HISENSE USA CORPORATION, Suwanee, GA (US); HISENSE INTERNATIONAL CO., LTD., Qingdao (CN)

(72) Inventors: Chenglong Liu, Qingdao (CN); Zhiqiang Li, Qingdao (CN)

(73) Assignees: QINGDAO HISENSE ELECTRONICS CO., LTD., Qingdao (CN); HISENSE USA CORPORATION, Suwanee, GA (US); HISENSE INTERNATIONAL CO., LTD., Qingdao (CN)

( * ) Notice: Subject to any disclaimer, the term of this patent is extended or adjusted under 35 U.S.C. 154(b) by 0 days.

(21) Appl. No.: 15/394,761

(22) Filed: Dec. 29, 2016

(65) Prior Publication Data

US 2017/0280204 A1 Sep. 28, 2017

(30) Foreign Application Priority Data

Mar. 25, 2016 (CN) .......................... 2016 1 0175351
Mar. 25, 2016 (CN) .......................... 2016 1 0175352

(51) Int. Cl.
*H04N 7/173* (2011.01)
*H04N 21/81* (2011.01)
(Continued)

(52) U.S. Cl.
CPC ..... *H04N 21/8173* (2013.01); *H04N 21/4438* (2013.01); *H04N 21/4516* (2013.01); *H04N 21/47* (2013.01)

(58) Field of Classification Search
CPC combination set(s) only.
See application file for complete search history.

(56) References Cited

U.S. PATENT DOCUMENTS 6,317,791 B1 * 11/2001 Cohn ................ G06F 17/30902
707/E17.12
2010/0088628 A1 * 4/2010 Flygh .................... G06F 3/0481
715/779
(Continued)

FOREIGN PATENT DOCUMENTS

CN 103176689 A 6/2013
CN 103324403 A 9/2013
(Continued)

OTHER PUBLICATIONS

The Chinese First Examination Report of corresponding China patent application No. 201610175351.5, dated Mar. 28, 2018.
(Continued)

*Primary Examiner* — Mulugeta Mengesha
(74) *Attorney, Agent, or Firm* — Hauptman Ham, LLP

(57) ABSTRACT

Present application discloses a method for switching an audio/video (AV) application, an apparatus and a smart TV. The method includes: receiving an instruction for switching to a target AV application; starting a preset intermediate interface and setting a AV application currently in use to be a background program, where a resource occupied by the intermediate interface is less than a resource occupied by the target AV application; and when the intermediate interface has been completely loaded, triggering the AV application, which has been set to be a background program, to release an AV decoder.

17 Claims, 4 Drawing Sheets

(51) Int. Cl.
*H04N 21/443* (2011.01)
*H04N 21/45* (2011.01)
*H04N 21/47* (2011.01)

(56) References Cited

U.S. PATENT DOCUMENTS

| | | | |
|---|---|---|---|
| 2011/0167364 A1 | 7/2011 | Pentikainen et al. | |
| 2013/0209065 A1* | 8/2013 | Yeung | H04N 21/41407 386/248 |
| 2013/0279877 A1* | 10/2013 | Boak | H04N 5/917 386/231 |
| 2015/0128042 A1 | 5/2015 | Churchill et al. | |
| 2016/0048412 A1* | 2/2016 | Liu | G06F 9/485 718/107 |
| 2016/0132344 A1* | 5/2016 | Funk | G06F 9/44578 719/328 |
| 2016/0373833 A1* | 12/2016 | Cain | H04N 21/818 |

FOREIGN PATENT DOCUMENTS

| | | |
|---|---|---|
| CN | 104994432 A | 10/2015 |
| CN | 105100915 A | 11/2015 |

OTHER PUBLICATIONS

The Chinese First Examination Report of corresponding China patent application No. 201610175352.X, dated Mar. 28, 2018.
State Intellectual Property Office of the People's Republic of China, Office Action and Search Report Issued in Application No. 201610175351.5, dated Nov. 13, 2018, 14 pages, (Submitted with Machine Translation).
State Intellectual Property Office of the People's Republic of China, Office Action and Search Report Issued in Application No. 201610175352.X, dated Nov. 13, 2018, 14 pages, (Submitted with Machine Translation).

* cited by examiner

METHOD FOR SWITCHING AN AUDIO/VIDEO APPLICATION, APPARATUS AND SMART TV

CROSS-REFERENCE TO RELATED APPLICATIONS

This application claims priorities to Chinese Patent Application No. 201610175352.X, filed on Mar. 25, 2016, entitled "METHOD FOR SWITCHING AN AUDIO/VIDEO APPLICATION, APPARATUS AND SMART TV", and Chinese Patent Application No. 201610175351.5, filed on Mar. 25, 2016, entitled "METHOD FOR SWITCHING AN AUDIO/VIDEO APPLICATION, APPARATUS AND SMART TV", which are hereby incorporated by reference in their entirety.

TECHNICAL FIELD

This application relates to the field of communication technology, particularly to a method for switching an audio/video (AV) application, an apparatus and a smart TV.

BACKGROUND

As smart displaying terminal devices evolve, and multimedia programs offers richer choices, various different applications are typically installed on smart TV for presenting multimedia programs of a diversity of contents from different sources. For example, as depicted in FIG. 1, on an application homepage, there are installed an application A for live TV, application B for network TV, application C for music playback, and the like.

Referring to FIG. 2, applications A, B and C, which are video or audio applications, share the audio/video (AV) decoder R of the smart TV. In a process where switching from application A to application B is performed, the smart TV typically receives an instruction for switching from application A to B, then starts the interface of application B. When the interface of application B is completely started, stopping of the interface of application A is triggered, followed by switching application A to the background. When the interface of application B is completely loaded, application A is triggered to release the AV decoder R it occupies. After the releasing is complete, application B sends playback instruction to the AV decoder R.

SUMMARY

Embodiments of the present application provide a method for switching an audio/video (AV) application, an apparatus and a smart TV.

Technical solutions provided herein are as the following.

On a first aspect, this application provides a method for switching an AV application, including:
receiving an instruction for switching to a target AV application;
starting a preset intermediate interface and setting an AV application currently in use to be a background program, where a resource occupied by the intermediate interface is less than a resource occupied by the target AV application;
triggering, when the intermediate interface has been completely loaded, the AV application, which has been set to be the background program, to release an AV decoder; and
instructing the target AV application to send a playback instruction to the AV decoder if the AV decoder is in an unoccupied state.

On another aspect, this application provides an apparatus for switching an audio/video (AV) application, including: a memory, a communication port and a processor, where the memory stores instructions, the processor is coupled with the memory and configured to execute the instructions stored in the memory, and the processor is configured to:
receive an instruction for switching to a target AV application via the communication port;
start a preset intermediate interface and set an AV application currently in use to be a background program, where a resource occupied by the intermediate interface is less than a resource occupied by the target AV application;
when the intermediate interface has been completely loaded, trigger the AV application, which has been set to be a background program, to release an AV decoder; and
instruct the target AV application to send a playback instruction to the AV decoder if the AV decoder is in an unoccupied state.

On yet another aspect, this application provides a smart TV that includes the above described apparatus for switching an AV application.

DETAILED DESCRIPTION

In order to make the purposes, the technical solutions and the advantages of the present application clearer, further details of the present application will be described in the following with reference to the accompanying drawings. Obviously, the described embodiments are only part of the embodiments of the present application, rather than all of them. According to the embodiments of the present application, all of the other embodiments obtained by those with ordinary skill in the art without consuming any creative work fall within the protection scope of the present application.

The following description of the present application refers to the accompanying drawings in which the same numbers in different drawings represent the same or similar elements unless otherwise indicated.

Embodiments of the present application provide a method for switching an audio/video (AV) application, the method being applicable to a terminal device, such as a smart TV, smartphone or the like, having a smart operation system (OS), such as an Android OS. For example, in descriptions of embodiments of the present application, the details are explained using the smart TV as an example, rather than an indication that this application is limited to smart TVs.

Figure 1:
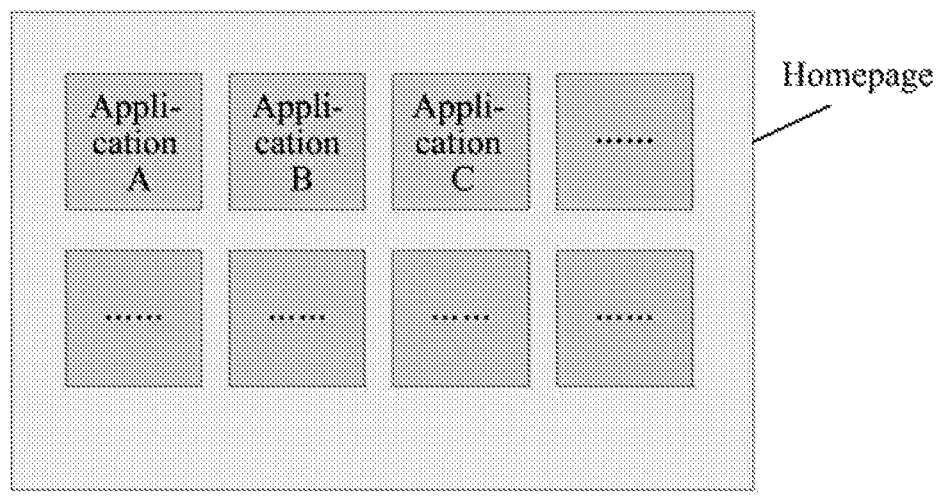
FIG. 1 is a schematic diagram illustrating a smart TV application homepage according to related art of the present application.
Figure 2:
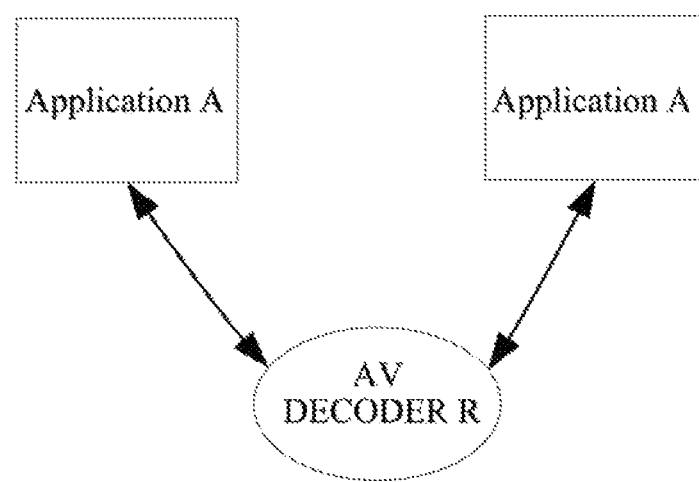
FIG. 2 is a signaling diagram for switching an audio/video (AV) application according to related art of the present application.
Figure 3:
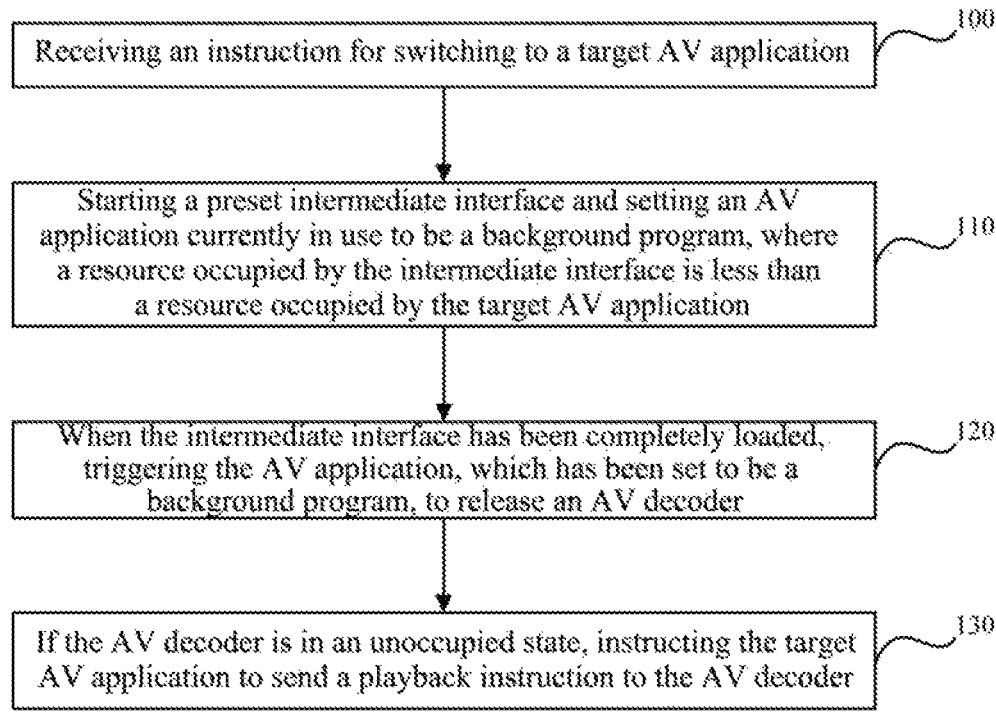
FIG. 3 is a flowchart illustrating a method for switching an AV application according to an embodiment of the present application.

FIG. 3 is a flowchart illustrating a method for switching an AV application according to an embodiment of the present application. Referring to the illustration of FIG. 3, the process for switching an AV application includes:

Step 100: receiving an instruction for switching to a target AV application.

A smart TV receives from a user a control command instructing the smart TV to retire a current AV application and switch to a target AV application. For example, if the smart TV is equipped with touch control technology, the user may input the switching command via a touch panel of the smart TV; if the smart TV is equipped with voice control technology, the user may input the switching command via a voice control module; and regardless of whether the smart TV is equipped with touch technology or voice control technology, the user may always send the switching command via a remote controller. For example, the process for performing step 100 will be detailed in the following using, as an example, the user sending the switching command to the smart TV via the remote controller.

For example, process for performing step 100 includes: the smart TV receives a remote controller key value sent from the user, and then the smart TV obtains the target AV application corresponding to the remote controller key value. After the remote controller key value sent from the user is received, the smart TV searches, in a correspondence list which configures the connections between remote controller key values and application identifications (IDs), for the application ID representing the target application corresponding to the remote controller key value. For example, the application ID may be the application name of the target application. For example, the correspondence list which configures the connections between remote controller key values and application IDs may be as shown in the Table 1 below.

| Key value | Application name |
|---|---|
| KeyEvent 1 | AV application A |
| KeyEvent 2 | AV application B |
| KeyEvent 3 | AV application C |
| KeyEvent 4 | Application D |

For example, a remote controller key value of KeyEvent 3 sent from the user via the remote controller is received at the smart TV running the AV application A for playback. After the key value is received, the smart TV queries Table 1, the correspondence list which configures the connections between remote controller key values and application IDs, hence concluding that the AV application C is the target AV application corresponding to the remote controller key value. Thus, an instruction for switching to the target AV application C is received, and the smart TV proceeds to perform step 110.

Step 110: starting a preset intermediate interface and setting an AV application currently in use to be a background program, where a resource occupied by the intermediate interface is less than a resource occupied by the target AV application.

In the process for performing step 100, the preset intermediate interface is started, and the AV application currently in use is set to be the background program simultaneously. For example, the smart TV is currently running the AV application A, such as iQIYI, when the remote controller key value KeyEvent 3 is received, i.e. the instruction for switching to the target AV application C, such as QQLive, is received. At this time, the preset intermediate interface is started, and the iQIYI is put to be the background program.

It should be noted that, the resource taken up by the intermediate interface is less than that of the AV application C. For instance, the intermediate interface may be a preset light-weight interface that includes no AV content and hence does not require any AV decoder. Or for another instance, the intermediate interface may have less interface content than the target AV application, hence may be started and loaded faster than the target AV application. For example, the intermediate interface may include just a layout control and a few interface contents to allow fast loading of the intermediate interface. Preferably, the intermediate interface may include no interface content except for one layout control. That is, the intermediate interface may be a blank interface to further improve the loading speed.

When the intermediate interface enters to the foreground after being completely started, the operation of the interface of the AV application A currently in use is triggered to pause. And then, the AV application A retreats to the background. It should be noted that, on an Android operation system (OS), the application currently in use to retreating from the foreground into the background is need to be triggered by the completely starting and entering to the foreground of an interface. In this case, the completely starting of an intermediate interface refers to a frame of the intermediate interface has been completely loaded while the content in the intermediate interface has not.

Step 120: when the intermediate interface has been completely loaded, triggering the AV application, which has been set to be a background program, to release an AV decoder.

On an Android OS, after the AV application A currently in use enters the background, the process of releasing the AV decoder is need to be triggered by the completely loading of a interface in the foreground. After the completely loading of the interface in the foreground, the AV application A in the background is triggered to stop using the player corresponding to the application A, and then the AV application A begins to release the AV decoder. In this case, the completely loading of the interface refers to both the frame and the content of the intermediate interface have been completely loaded.

For example, when the AV application A is, for instance, an iQIYI, a third party video application, the step 110 includes: after the intermediate interface is started and entered the foreground, the currently used iQIYI retreats from the foreground into the background; when the intermediate interface in the foreground has been completely loaded, the iQIYI in the background is triggered to stop using its corresponding iQIYI video player; and after the iQIYI video player has stopped to be in use, the AV decoder occupied by the iQIYI video player begins to be released.

Considering that, on the Android OS, after the AV application currently in use enters the background, the process of releasing the AV decoder is need to be triggered by the completely loading of an interface in the foreground. Since the intermediate interface in embodiments of this application is a lightweight interface that contains less interface content than the target AV application, the intermediate interface is loaded faster than the target AV application. Therefore, the intermediate interface in embodiments of this application can realize a faster loading speed after entering the foreground, thus the triggering of the AV application currently in use to release the AV decoder can be triggered to release the AV decoder earlier. Thereby the waiting time for releasing the AV decoder is shortened.

After the completely loading of the interface in the foreground, the AV application A in the background is triggered to release the occupied AV decoder, at the same time the playback interface of the target AV application C is triggered to start. After the playback interface of the target AV application C is started and enters the foreground, the intermediate interface is triggered to retreat from the foreground into the background, at the same time the target AV application C begins loading its interface content.

It should be noted herein that, after the completely loading of the interface in the foreground, the playback interface of the target AV application C is started firstly, rather than go straight to use the AV application C to begin playback of the corresponding AV resource. This is based on the consideration that the AV application C and the AV application A might be sharing the same AV decoder, and even when the playback interface of the AV application C is set to be the current playback interface, the AV application A that has retreated to the background might not necessarily have released the AV decoder that it occupies. Therefore, after step 120 is completed, it is necessary to determine whether the AV decoder is in an unoccupied state, and step 130 may only begin after the AV decoder is in an unoccupied state.

Taking a smart TV running on the Android OS for instance, the Android OS is provided with only one decoder. Of course, many of the other operation systems, such the iOS, are also typically provided with only one decoder. Even in the few operation systems where two decoders are provided, two AV applications may still occasionally share the same decoder resource. Therefore, a terminal device in embodiments of the present application may have one, two or more decoders, which is specified herein.

Figure 4:
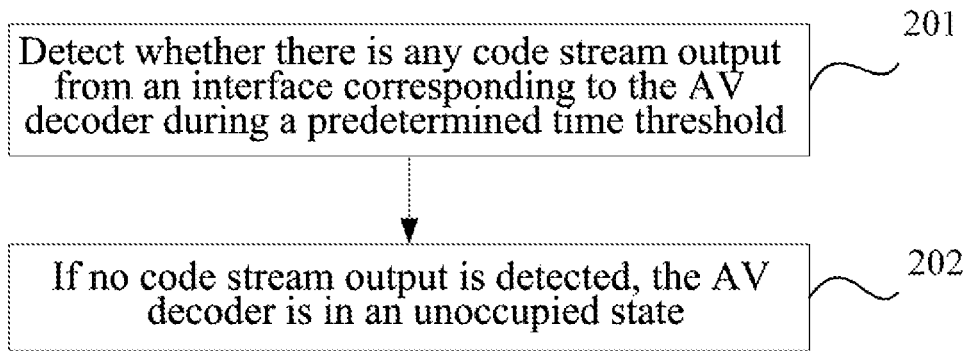
FIG. 4 is a flowchart illustrating querying for the state of an AV decoder according to an embodiment of the present application.

For the purpose of preventing the AV application A and the AV application C from using the same AV decoder, embodiments of the present application queries for the state of the AV decoder after the playback interface of the target AV application C is started. As depicted in FIG. 4, the querying steps may be as the following.

Step 201: the interface corresponding to the AV decoder is called to detect whether any code stream output is output during a predetermined time threshold; and Step 202: if no code stream output is detected, the AV decoder is determined to be in an unoccupied state.

The smart TV may determine whether the AV decoder has been released by calling the interface corresponding to the AV decoder to detect whether any code stream output is found at the interface during a predetermined time threshold. That is, the smart TV may determine whether the AV application C has released the AV decoder it occupies by looking at whether any AV data is output from the AV decoder. If no AV data output is found at the interface of the AV decoder during the predetermined time threshold, it means the AV application C has released the AV decoder it occupies, i.e. the AV decoder is in an unoccupied state. If any AV data output is found at the interface of the AV decoder during the predetermined time threshold, it means the AV application C has not completed releasing the AV decoder it occupies, i.e. the AV decoder is in an occupied state.

During the process where step 201 is performed, if any AV data output is detected at the interface of the AV decoder during the predetermined time threshold, step 201 is cycled according to a predetermined querying period. That is, the detection for AV data output at the interface of the AV decoder during the predetermined time threshold is repeated according to a predetermined cycling period, until no code stream output is detected at the interface corresponding to the AV decoder during the predetermined time threshold. Only then the process proceeds to step 202.

For example, the predetermined querying period may be set at 250 ms. Of course, the predetermined querying period may be shorter, e.g. set to 200 ms, in order to begin playback of the target AV application C as early as possible.

It should be noted that, in a practical implementation, the predetermined querying period may also be a variable period. For example, the first query may be made according to 250 ms as the predetermined querying period, then the second according to 200 ms, the third according to 150 ms, and so on. Thus, it may be possible to acquire the state of the decoder earlier, thereby beginning playback of the target AV application faster as sooner as the decoder becomes unoccupied.

It should be noted that, the predetermined querying period may be of any length. For example, the predetermined querying period may be 0.01 ms, or 0.1 ms, or 100 ms, which will not be limited in embodiments herein.

When the decoder is in an unoccupied state, proceed to step 130: if the AV decoder is in an unoccupied state, instructing the target AV application to send a playback instruction to the AV decoder.

As can be seen from the above embodiments, the smart TV starts a preset intermediate interface after an instruction for switching to a target AV application is received. The intermediate interface enters into the foreground, and triggers a currently used AV application to retreat to the background. Further, after the loading of the intermediate interface, the AV application in the background is triggered to begin to release the AV decoder it occupies, and a playback interface of the target AV application is started. Alternatively, the playback interface of the target AV application is started after the releasing of the AV decoder. Then, the target AV application sends a playback instruction to the AV decoder, and the process of switching the AV application ends. Thus, the time taken in embodiments of the present application to switch the AV application is the sum of the time for starting and loading the intermediate interface, plus the time for releasing the AV decoder. In contrast, the time taken in related art to switch the AV applications is the sum of the time for starting and loading the target AV application, plus the time for releasing the AV decoder. Since the intermediate interface has less interface content than the target AV application, the time taken to start and load the intermediate interface is shorter than that for the target AV application. Therefore, the method in embodiments of the present application for switching AV shortens the time taken to switch from one AV application to another, which reduces the waiting time for the playback of the target AV application, thereby enhancing user experience of the smart TV.

Further, before the step 110, after the instruction for switching to the target AV application is received, an application switching animation is rendered on the displaying screen of the smart TV. Since a window layer of the animation playback window is above a window layer of the AV application, an AV application interface window is in a state of invisibility. Thus the intermediate interface started at step 120 will not be seen by the user throughout the interface switching process.

For example, the application switching animation may be an animation file preset in the smart TV, or a preset image or application screenshot upon which zooming, sliding, expanding or other animation effects are imposed.

For the purpose of better describing the method embodiments of the present application for switching an AV application, detailed explanations will be given in the following in conjuncture with examples.

Taking a smart TV running on Android OS for example, the smart TV is currently on playback for Country Love using an iQIYI X, and a user intends to switch the smart TV to Total Soccer on a live TV Y. After an instruction for switching to the live TV Y is received at the smart TV, the switching process is as shown in FIG. 5.

Figure 5:
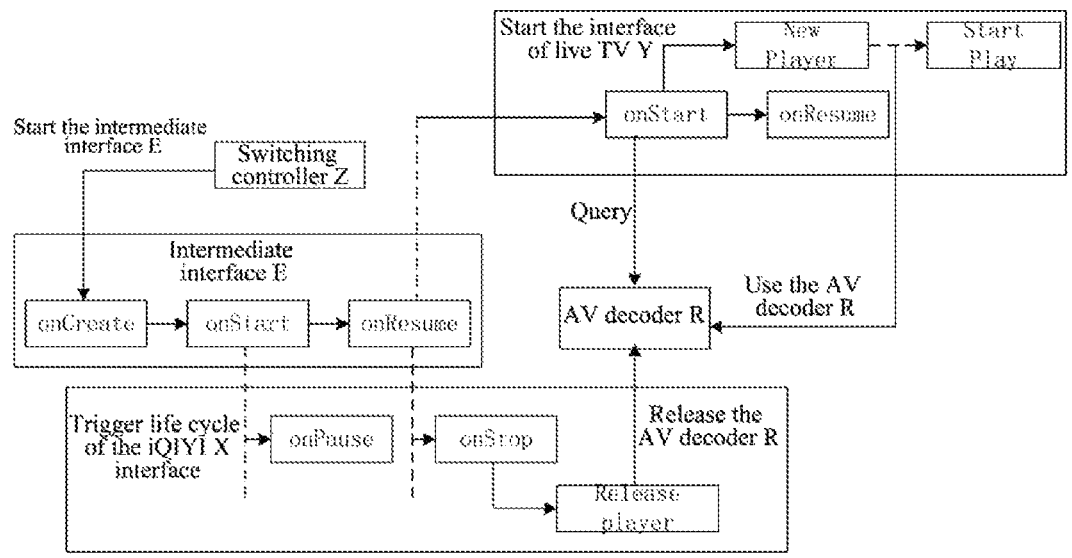
FIG. 5 is a flowchart illustrating a switching from an iQIYI to a live TV according to an embodiment of the present application.

Referring to the illustration of FIG. 5, after the instruction from the user for switching to the live TV Y is received at the smart TV, a switching controller Z sends starting signal to a preset intermediate interface E. Meanwhile, the switching controller Z causes the smart TV to play a preset switching animation file on a window layer which is above that of the iQIYI X and the live TV Y. Throughout the entire switching process, it will be the playback interface of the switching animation file that is presented on the displaying screen of the smart TV.

Further, if it is the first time the intermediate interface E is started when the starting signal sent from the switching controller Z is received, the intermediate interface E will enter into an onCreate life cycle (a period for creating), then onStart life cycle (a period for starting). If it is not the first time, the intermediate interface E will go straight to the onStart life cycle (a period for starting).

For example, the intermediate interface is a blank interface that includes no more than a layout control, with no interface content to be added. Thus, the onCreate and onStart life cycles of the intermediate interface E will only last for a very short time span, allowing the intermediate interface E to be rapidly pulled up into the foreground.

Further, while the intermediate interface E is going into the onStart life cycle, the iQIYI X interface is triggered to enter into the onPause life cycle (a period for pausing), and then retreats from the foreground into the background. At the end of the onStart life cycle, the intermediate interface E is completely loaded, and will go into an onResume life cycle (a period for using). When in the onResume life cycle, the intermediate interface E triggers the iQIYI X interface, which is in the background, to go into an onStop life cycle (a period for stopping). When in the onStop life cycle, the iQIYI X interface moves on to stop and release its corresponding player, then release the AV decoder R occupied by the iQIYI X.

Further, when the switching controller Z detects that the AV decoder R has been released, the switching controller Z sends starting signal to the live TV Y. If it is the first time the live TV Y is started when the starting signal is received, the live TV Y enters into the onCreate life cycle, and then the onStart life cycle. If it is not the first time, the live TV Y goes straight to the onStart life cycle.

Further, the live TV Y enters the foreground while entering into the onStart life cycle, at the same time the intermediate interface E is triggered to go into the onPause life cycle. Then, the intermediate interface E retreats from the foreground to the background, and finally enters into the onStop life cycle. While the live TV Y goes to the foreground, the playback window for the switching animation file is stopped, and interface content of the live TV is shown on the displaying screen of the smart TV.

While entering into the onStart life cycle, the live TV Y starts its corresponding live TV player. After the live TV interface has been loaded, the live TV Y goes into onResume life cycle, calling the AV decoder R to begin playback of its corresponding AV resource.

Therefore, the method for switching an AV application according to the embodiments of the present application can effectively prevent the iQIYI X that is currently in use to share the same AV decoder R with the live TV Y that is to be switched to, further avoiding frozen screen, blank screen, blurred screen, sound without image or other phenomenon caused by accessing the same AV decoder R at the same time. Meanwhile, the method for switching an AV application according to the embodiments of the present application does not require that the coding and/or the playback process of the live TV Y be modified or adapted to the querying interface for the AV decoder R of the smart TV, thus offering better applicability.

Figure 6:
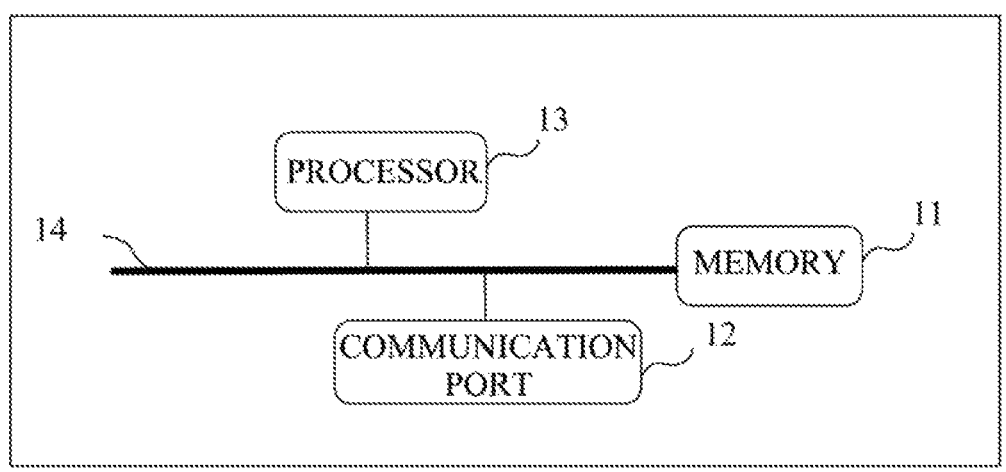
FIG. 6 is a flowchart illustrating an apparatus for switching an AV application according to an embodiment of the present application.

Based on the same inventive concept, embodiments of the present application further provide an apparatus for switching an audio/video (AV) application. As depicted in FIG. 6, the apparatus may include a memory 11, a communication port 12, a processor 13 and a communication bus 14. In this case, the memory 11 is configured to store application instructions, the processor 13 is coupled to the memory 11, and the communication bus 14 is configured to realize communication connections between the parts. The processor 13 is configured to execute instructions stored in the memory 11, and is configured to: receive an instruction for switching to a target AV application via the communication port; start a preset intermediate interface and set an AV application currently in use to be a background program, where a resource occupied by the intermediate interface is less than a resource occupied by the target AV application; when the intermediate interface has been completely loaded, trigger the AV application, which has been set to be a background program, to release an AV decoder; and if the AV decoder is in an unoccupied state, instruct the target AV application to send a playback instruction to the AV decoder.

The processor 13 may be a Central Processing Unit (CPU) or a Application Specific Integrated Circuit (ASIC), or be configured to be one or more integrated circuits (ICs) according to embodiments of the present application.

If the memory 11 and the processor 13 are implemented independently, they may be interconnected to accomplish mutual communication via the communication bus 14. The communication bus 14 may be an Industry Standard Architecture (ISA) bus, a Peripheral Component (PCI) bus, an Extended Industry Standard Architecture (EISA) bus or the like. The communication bus 14 may include, for example, an address bus, a data bus and a control bus. The bus depicted in figure using a single thick line for illustrative purpose only, and by no means indicates there is only one bus or only one type of bus.

The apparatus shown in this embodiment of the present application is capable of carrying out the technical solution shown in the foregoing method embodiments following similar implementation principals and producing similar advantageous effects, neither of which will be repeated herein.

In an implementation, the processor 13 is configured to:
if the AV decoder is in an unoccupied state, start a playback interface of the target AV application, and instruct the target AV application to send the playback instruction to the AV decoder.

In another implementation, the processor 13 is configured to:
start a playback interface of the target AV application.

In yet another implementation, the resource occupied by the intermediate interface is less than the resource occupied by the target AV application, which includes:

the intermediate interface does not utilize the AV decoder, and/or the intermediate interface contains less interface content than the target AV application.

In yet another implementation, the intermediate interface is a blank interface.

In yet another implementation, the processor 13 is configured to:

query for a state of the AV decoder; and if the AV decoder is in an unoccupied state, instruct the target AV application to send the playback instruction to the AV decoder.

In yet another implementation, the processor 13 is configured to:

detect whether there is any code stream output from an interface corresponding to the AV decoder during a predetermined time threshold; and if no code stream output is detected, the AV decoder is unoccupied.

In yet another implementation, the processor 13 is configured to:

if the AV decoder is in a busy state, continue the querying for the state of the AV decoder according to a predetermined querying period; and if the AV decoder is found through the querying to be in an unoccupied state, instruct the target AV application to send the playback instruction to the AV decoder.

In yet another implementation, the processor 13 is configured to:

start an animation playback window after the instruction for switching to a target AV application is received, where a window layer of the animation playback window is above a window layer of an AV application; and play an application switching animation in the animation playback window.

Figure 7:
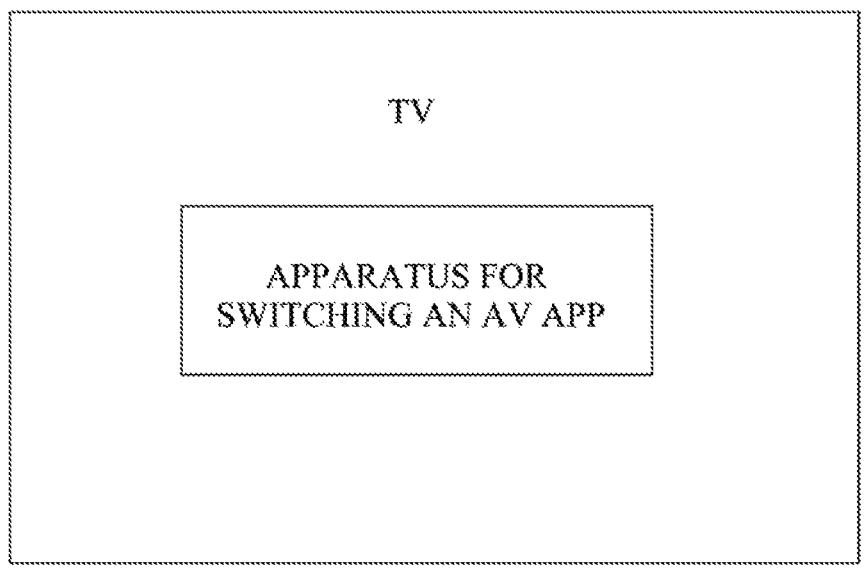
FIG. 7 is a schematic view illustrating a smart TV according to an embodiment of the present application.

FIG. 7 is a schematic view illustrating a smart TV according to an embodiment of the present application. Referring to FIG. 7, the smart TV includes the apparatus for switching an AV application provided in the embodiment in FIG. 6. The smart TV is capable of carrying out the method provided in the embodiment for switching an AV application following principals and producing similar advantageous effects similar to those in the first embodiment, neither of which will be repeated herein.

One with ordinary skill in the art may understand that, part of or all steps for realizing the foregoing embodiments of the method may be completed through hardware relevant to the program instructions. The above program may be stored in a computer, a handphone or a readable storage medium of other portable devices. Steps including the above embodiments of the method are executed during execution of the program; and the above storage medium includes: ROMs, RAMs, magnetic disks or optical disks and other media capable of storing program codes.

Finally, it should be noted that, the above embodiments are merely meant to illustrate rather than limit the technical solutions of the present application; and although the present application has been concretely described in reference to the above embodiments, one with ordinary skill in the art shall understand that modifications can still be made to the technical solutions recorded in the foregoing embodiments, or that equivalent substitutions can still be made to part or all of the technical features therein; neither these modifications nor these substitutions shall make the essence of the corresponding technical solutions depart from the scope of the technical solutions in the above embodiments of the present application.

What is claimed is:

1. A method for switching an audio/video (AV) application, comprising:

receiving an instruction for switching to a target AV application;

starting a preset intermediate interface and setting an AV application currently in use to be a background program, wherein a resource occupied by the intermediate interface is less than a resource occupied by the target AV application;

triggering, in response to the intermediate interface has been completely loaded, the AV application, which has been set to be the background program, to release an AV decoder; and instructing the target AV application to send a playback instruction to the AV decoder if the AV decoder is in an unoccupied state;

wherein the resource occupied by the intermediate interface being less than the resource occupied by the target AV application comprises:

the intermediate interface does not utilize the AV decoder, and/or the intermediate interface contains less interface content than the target AV application.

2. The method according to claim 1, wherein the instructing the target AV application to send a playback instruction to the AV decoder if the AV decoder is in an unoccupied state comprises:

if the AV decoder is in an unoccupied state, starting a playback interface of the target AV application, and instructing the target AV application to send the playback instruction to the AV decoder.

3. The method according to claim 1, wherein before the instructing the target AV application to send a playback instruction to the AV decoder if the AV decoder is in an unoccupied state, the method further comprises:

starting a playback interface of the target AV application.

4. The method according to claim 1, wherein the intermediate interface is a blank interface.

5. The method according to claim 1, wherein the instructing the target AV application to send a playback instruction to the AV decoder if the AV decoder is in an unoccupied state comprises:

querying for a state of the AV decoder; and instructing the target AV application to send the playback instruction to the AV decoder if the AV decoder is in an unoccupied state.

6. The method according to claim 5, wherein the querying for a state of the AV decoder comprises:

detecting whether there is any code stream output from an interface corresponding to the AV decoder during a predetermined time threshold;

wherein if no code stream output is detected, the AV decoder is unoccupied.

7. The method according to claim 5, wherein the querying for a state of the AV decoder comprises:

if the AV decoder is in a busy state, continuing the querying for the state of the AV decoder according to a predetermined querying period; and if the AV decoder is found through the querying to be in an unoccupied state, instructing the target AV application to send the playback instruction to the AV decoder.

8. The method according to claim 1, wherein after the receiving an instruction for switching to a target AV application, the method further comprises:

starting an animation playback window, wherein a window layer of the animation playback window is above a window layer of an AV application; and playing an application switching animation in the animation playback window.

9. An apparatus for switching an audio/video (AV) application, comprising:
- a memory, a communication port and a processor, wherein the memory stores instructions, the processor is coupled with the memory and configured to execute the instructions stored in the memory, and the processor is configured to:
- receive an instruction for switching to a target AV application via the communication port;
- start a preset intermediate interface and set a AV application currently in use to be a background program, wherein a resource occupied by the intermediate interface is less than a resource occupied by the target AV application;
- in response to the intermediate interface has been completely loaded, trigger the AV application, which has been set to be a background program, to release an AV decoder; and
- instruct the target AV application to send a playback instruction to the AV decoder if the AV decoder is in an unoccupied state;
- wherein the resource occupied by the intermediate interface being less than the resource occupied by the target AV application comprises:
- the intermediate interface does not utilize the AV decoder, and/or the intermediate interface contains less interface content than the target AV application.

10. The apparatus according to claim 9, wherein the processor is configured to:
- if the AV decoder is in an unoccupied state, start a playback interface of the target AV application, and instruct the target AV application to send the playback instruction to the AV decoder.

11. The apparatus according to claim 9, wherein the processor is configured to:
- start a playback interface of the target AV application.

12. The apparatus according to claim 9, wherein the intermediate interface is a blank interface.

13. The apparatus according to claim 9, wherein the processor is configured to:
- query for a state of the AV decoder; and
- if the AV decoder is in an unoccupied state, instruct the target AV application to send the playback instruction to the AV decoder.

14. The apparatus according to claim 13, wherein the processor is configured to:
- detect whether there is any code stream output from an interface corresponding to the AV decoder during a predetermined time threshold; and
- if no code stream output is detected, the AV decoder is unoccupied.

15. The apparatus according to claim 13, wherein the processor is configured to:
- if the AV decoder is in a busy state, continue the querying for the state of the AV decoder according to a predetermined querying period; and
- if the AV decoder is found through the querying to be in an unoccupied state, instruct the target AV application to send the playback instruction to the AV decoder.

16. The apparatus according to claim 9, wherein the processor is configured to:
- start an animation playback window after the instruction for switching to a target AV application is received, wherein a window layer of the animation playback window is above a window layer of an AV application; and
- play an application switching animation in the animation playback window.

17. A smart TV, comprising the apparatus for switching an AV application according to claim 9.

* * * * *